United States Patent
Jacobson et al.

(10) Patent No.: US 10,608,497 B2
(45) Date of Patent: Mar. 31, 2020

(54) ELECTRIC POWER SYSTEM HAVING ENERGY STORAGE WITH MOTOR-CHARGED FLYWHEEL

(71) Applicant: Caterpillar Inc., Peoria, IL (US)

(72) Inventors: Evan Jacobson, Edwards, IL (US); John Seipold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/844,775

(22) Filed: Dec. 18, 2017

(65) Prior Publication Data

US 2019/0190346 A1  Jun. 20, 2019

(51) Int. Cl.
| | | |
|---|---|---|
| H02K 7/02 | (2006.01) | |
| F16H 47/04 | (2006.01) | |
| H02K 7/18 | (2006.01) | |
| H02K 47/00 | (2006.01) | |
| F16F 15/30 | (2006.01) | |

(52) U.S. Cl.
CPC ............ *H02K 7/025* (2013.01); *F16H 47/04* (2013.01); *H02K 7/1815* (2013.01); *H02K 47/00* (2013.01); *F16F 15/30* (2013.01)

(58) Field of Classification Search
CPC .......... F16F 15/30; F16H 47/04; H02K 47/00; H02K 7/025; H02K 7/1815; B60Y 2200/412
See application file for complete search history.

(56) References Cited

U.S. PATENT DOCUMENTS

| | | | |
|---|---|---|---|
| 4,290,320 A | 9/1981 | Abbott | |
| 4,926,107 A | 5/1990 | Pinson | |
| 5,646,458 A | 7/1997 | Bowyer et al. | |
| 6,563,229 B2 | 5/2003 | Farkas | |
| 8,022,572 B2 | 9/2011 | Vyas et al. | |
| 9,028,362 B2* | 5/2015 | He | B60K 6/105 477/3 |
| 9,108,625 B2 | 8/2015 | Tanaka et al. | |
| 9,141,095 B2* | 9/2015 | Siegel | G05B 11/32 |
| 9,162,560 B2* | 10/2015 | Jacobson | B60W 10/24 |
| 9,718,343 B2* | 8/2017 | Atkins | B60K 6/105 |
| 10,066,700 B2* | 9/2018 | Jacobson | F16F 15/315 |
| 2009/0140576 A1 | 6/2009 | Yu et al. | |

(Continued)

FOREIGN PATENT DOCUMENTS

| | | |
|---|---|---|
| CN | 101382046 B | 4/2011 |
| CN | 101826773 B | 9/2011 |

*Primary Examiner* — Tulsidas C Patel
*Assistant Examiner* — S. Mikailoff
(74) *Attorney, Agent, or Firm* — Brannon Sowers & Cracraft

(57) ABSTRACT

An electric power system includes an engine, a generator, a drivetrain including a driveshaft, and an energy storage system having a flywheel. In an implementation, a parallel-path continuously variable transmission is structured to transfer energy between the flywheel and the driveshaft, and in another implementation a parallel-path continuously variable transmission transfers energy between the engine and the generator. The transmission includes a variator and a differential geartrain. An electric motor is coupled to the flywheel and charges the flywheel such that stored flywheel energy is available for bringing up engine speed from a standby state and/or to accommodate generator load changes with limited generator speed changes.

16 Claims, 7 Drawing Sheets

(56) References Cited

U.S. PATENT DOCUMENTS

| | | | |
|---|---|---|---|
| 2010/0280712 A1* | 11/2010 | Bowman | B60K 6/105 701/36 |
| 2012/0197472 A1* | 8/2012 | He | B60K 6/105 701/22 |
| 2014/0045651 A1* | 2/2014 | Jacobson | B60K 6/105 477/70 |
| 2014/0046538 A1* | 2/2014 | Siegel | G05B 11/32 701/36 |
| 2014/0103761 A1* | 4/2014 | Atkins | B60K 6/105 310/74 |
| 2016/0017992 A1 | 1/2016 | Lister | |
| 2018/0023660 A1* | 1/2018 | Jacobson | F16F 15/315 123/193.5 |
| 2019/0190346 A1* | 6/2019 | Jacobson | H02K 7/025 |

* cited by examiner

ELECTRIC POWER SYSTEM HAVING ENERGY STORAGE WITH MOTOR-CHARGED FLYWHEEL

TECHNICAL FIELD

The present disclosure relates generally to flywheel energy storage in a power system, and more particularly to flywheel energy storage where an electric motor is provided for charging a flywheel.

BACKGROUND

Energy storage systems for many different machines are well known and widely used. Systems such as regenerative braking systems known from mobile vehicle applications may store energy from decelerating a vehicle that would otherwise be lost in an electrical energy storage device such as a battery or a capacitor. Hydraulic systems commonly store energy for subsequent recovery in pressure accumulators or the like. Flywheels have been used for literally centuries to store kinetic energy, and are now increasingly applied in mobile vehicle and machinery applications. A flywheel stores kinetic energy in a rotating rotor that can be sped up to store energy when extra energy is available, and slowed down to extract the stored energy when desired. High-speed flywheels, having rotational speeds in the tens of thousands of revolutions per minute, are commercially available and have been applied with some commercial success in the automotive context, for example.

One technical challenge relating to high-speed flywheels is the relatively great speed difference between a charged or energized flywheel and the system with which it interacts. In the case of an internal combustion engine, the engine speed may be as much as a few thousand revolutions per minute, but still potentially an order of magnitude, or more, less than potential speeds of the flywheel. As it is generally desirable to use a relatively small and lightweight flywheel that will rotate relatively fast, as opposed to a heavy, bulky, and slower flywheel, apparatus is typically necessary for matching the speeds of the two systems.

Since mechanical transmission systems can have inherent structural and material limitations as to the maximum speeds and/or speed ratios within the system, multi-range transmission systems have been proposed to account for the large speed ratios in flywheel energy storage systems. Engineers have also proposed continuously variable transmission or "CVT" systems to transfer torque between a flywheel and an engine or other mechanism having a prime mover. U.S. Pat. No. 9,108,625 proposes a planetary gear device between a driving wheel and an energy accumulating device. A sun gear of the planetary gear device is connected to an input shaft of the energy accumulating device. A carrier of the planetary gear device is connected to the driving wheel. A torque adjusting device is apparently electronically controlled to vary a braking torque applied to a ring gear in the planetary to reduce a difference in rotational speeds between an input shaft and the sun gear. While the strategy in the '625 patent may have certain applications it is relatively complex, and there is ample room for improvements and other advancements in the field.

SUMMARY OF THE INVENTION

In one aspect, an electric power system includes an engine, a generator, and a drivetrain structured to transfer torque between the engine and the generator. The electric power system further includes an energy storage system having a flywheel, a speed-up geartrain coupled with the flywheel, and an electric motor coupled to the speed-up geartrain for charging the flywheel. The electric power system further includes a clutch adjustable between an engaged state where the clutch couples the speed-up geartrain to at least one of the engine or the drivetrain, to transfer energy between the flywheel and the at least one of the engine or the drivetrain, and a disengaged state.

In another aspect, a method of operating an electric power system includes operating a drivetrain coupled between an engine and a generator in the electric power system, and applying a torque to the generator by way of the operating of the drivetrain. The method further includes rotating an energy storage flywheel in the electric power system by way of an electric motor. The method further includes adjusting a clutch in the electric power system between an engaged state, where the clutch couples the energy storage flywheel to at least one of the engine or the drivetrain, and a disengaged state. The method further includes varying energy transfer among the engine, the energy storage flywheel, and the generator by way of the adjusting of the clutch between an engaged state and a disengaged state.

In still another aspect, a drive system for an electric power system includes a drivetrain having an input shaft structured to couple with an engine, an output shaft structured to couple with a generator, and a parallel-path continuously variable transmission coupled between the input shaft and the output shaft. The drive system further includes an energy storage system coupled with the drivetrain and having a flywheel, a speed-up geartrain coupled with the flywheel, and an electric motor coupled to the speed-up geartrain for charging the flywheel. The drive system further includes a clutch adjustable between an engaged state where the clutch couples the speed-up geartrain to the input shaft, to transfer energy between the flywheel and at least one of the engine or the drivetrain, and a disengaged state.

DETAILED DESCRIPTION

Figure 1:
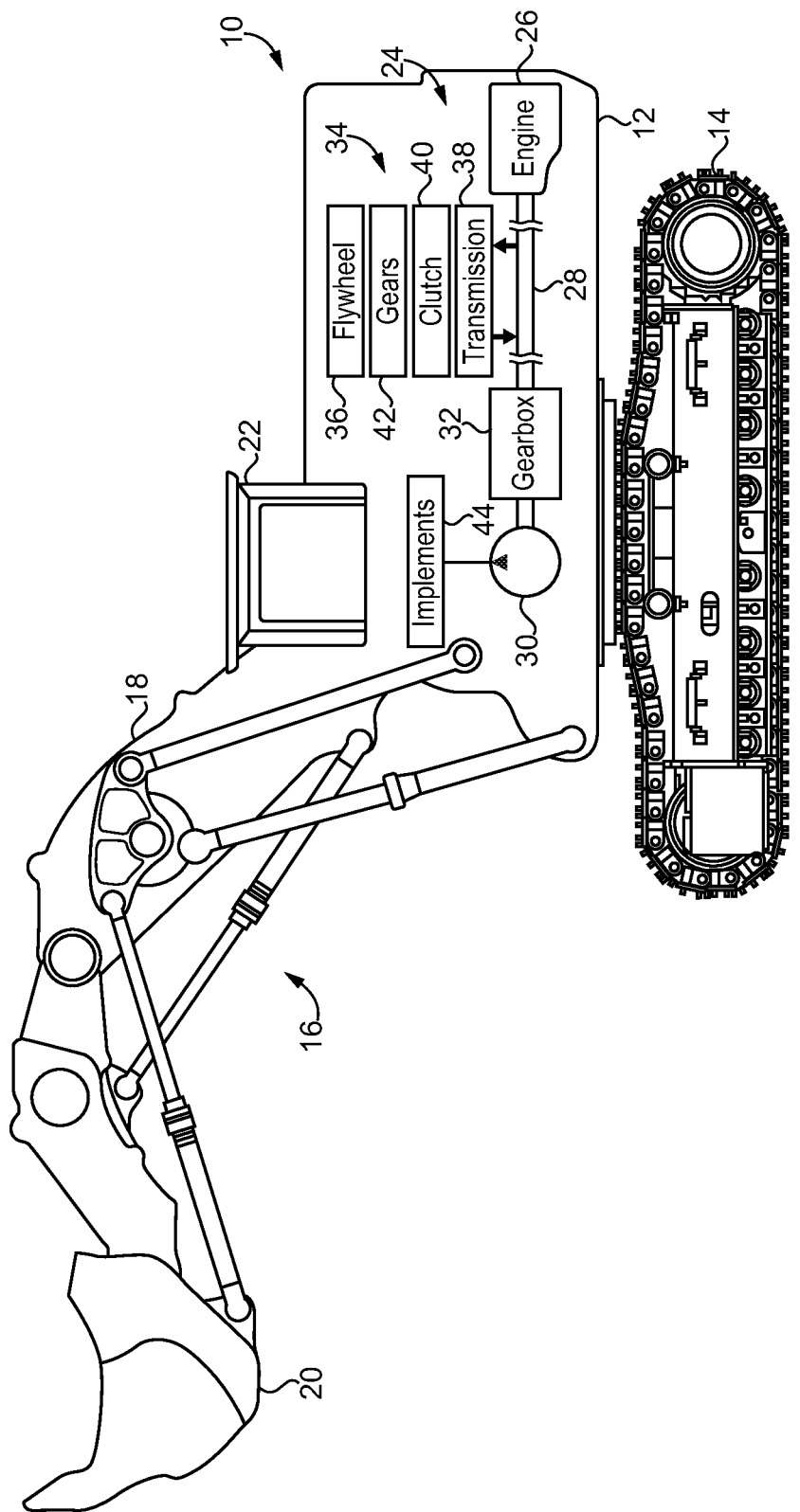
FIG. 1 is a side diagrammatic view of a machine, according to one embodiment.

Referring to FIG. 1, there is shown a machine 10 according to one embodiment, and including a frame 12 with an operator cab 22 mounted thereon, and supported upon ground-engaging propulsion elements 14. Machine 10 includes a hydraulically actuated implement system 16 having a boom 18 and a bucket 20. Machine 10 is shown in the context of a track-type machine for excavating, mining, and similar applications and known in the art as a front shovel. It should be appreciated that machine 10 might not be a track-type machine, or a machine for off-highway applications at all. In the off-highway context, machine 10 could include a tractor, a loader, a backhoe, a truck, or any of a variety of other machine types. On-highway machines such as a truck or the like could also benefit from application of the teachings set forth herein.

Machine 10 further includes a power system 24 having an engine 26, such as an internal combustion compression ignition diesel engine, a rotatable load 30, and a driveshaft 28 structured for coupling and transferring torque between engine 26 and rotatable load 30. A gearbox 32 is also coupled between driveshaft 28 and rotatable load 30. In the illustrated embodiment, rotatable load 30 (hereinafter "pump 30") includes a hydraulic pump structured to provide pressurized hydraulic fluid to implement hydraulics 44. Implement hydraulics 44 can include the various valves, conduits, accumulators, controls, actuators, and other apparatus for operating hydraulically actuated implement system 16. Pump 30 could also be structured to provide hydraulic fluid to a hydraulically actuated propulsion system of machine 10, such as hydraulic motors (not shown) that drive ground-engaging elements 14. Driveshaft 28 could include a single shaft, multiple shafts coupled together by way of one or more universal joints, transfer gears, differential gears, and still other apparatus. Gearbox 32 can include speed reduction gears, for example, to transfer torque between driveshaft 28 and pump 30. Other machine loads such as additional pumps, compressors, traction drive mechanisms, and still others could also be operated by way of power system 24 with power takeoff from driveshaft 28.

It should further be appreciated that power system 24 may be structured not only to provide rotational power or torque to various components, but potentially also to receive rotational power inputs or torque from the driven components of the system. For example, hydraulically actuated implement system 16 could be structured to store energy during lowering of boom 18 in an accumulator, and then return energy for raising boom 18 as appropriate. Pump 30 could also include a hydraulic pump/motor that can be operated in a motoring mode when regenerative hydraulic pressure is available so as to rotate other components of machine 10 for energy storage purposes as further discussed herein. Pump 30 could be motored to drive a flywheel, for example. Moreover, a propulsion system of machine 10 could be structured to recover energy of braking machine 10 and store the regenerative energy as kinetic energy, fluid pressure, or electrical or chemical energy according to a variety of strategies.

Power system 24 further includes an energy storage system 34 that is structured to receive energy from, and return energy to, driveshaft 28. When engine 26 is operated with excess output power some or substantially all of the output power produced by engine 26 at least for a time can be stored in energy storage system 34. When extra energy above an output of engine 26 is desired, the stored energy in energy storage system 34 can be returned to driveshaft 28, or to other systems. This general strategy can enable engine 26 to operate at a substantially constant speed and/or smoothly manage transients, assisting in optimizing efficiency and exhaust emissions among other advantages. Energy storage system 34 includes a transmission 38 coupled with driveshaft 28, and a flywheel 36, or a plurality of flywheels such as a plurality of flywheels arranged in parallel, in series, or parallel series stacks of flywheels. Energy storage system 34 also includes a speed-up and/or reduction geartrain(s) or gears 42, and a clutch 40 coupled between flywheel 36 and transmission 38. As will be further apparent from the following description, machine 10, power system 24, and other machine and power system embodiments contemplated herein, are uniquely configured for efficient transfer of energy between driveshaft 28 and flywheel 36 in an apparatus having a single range.

Figure 2:
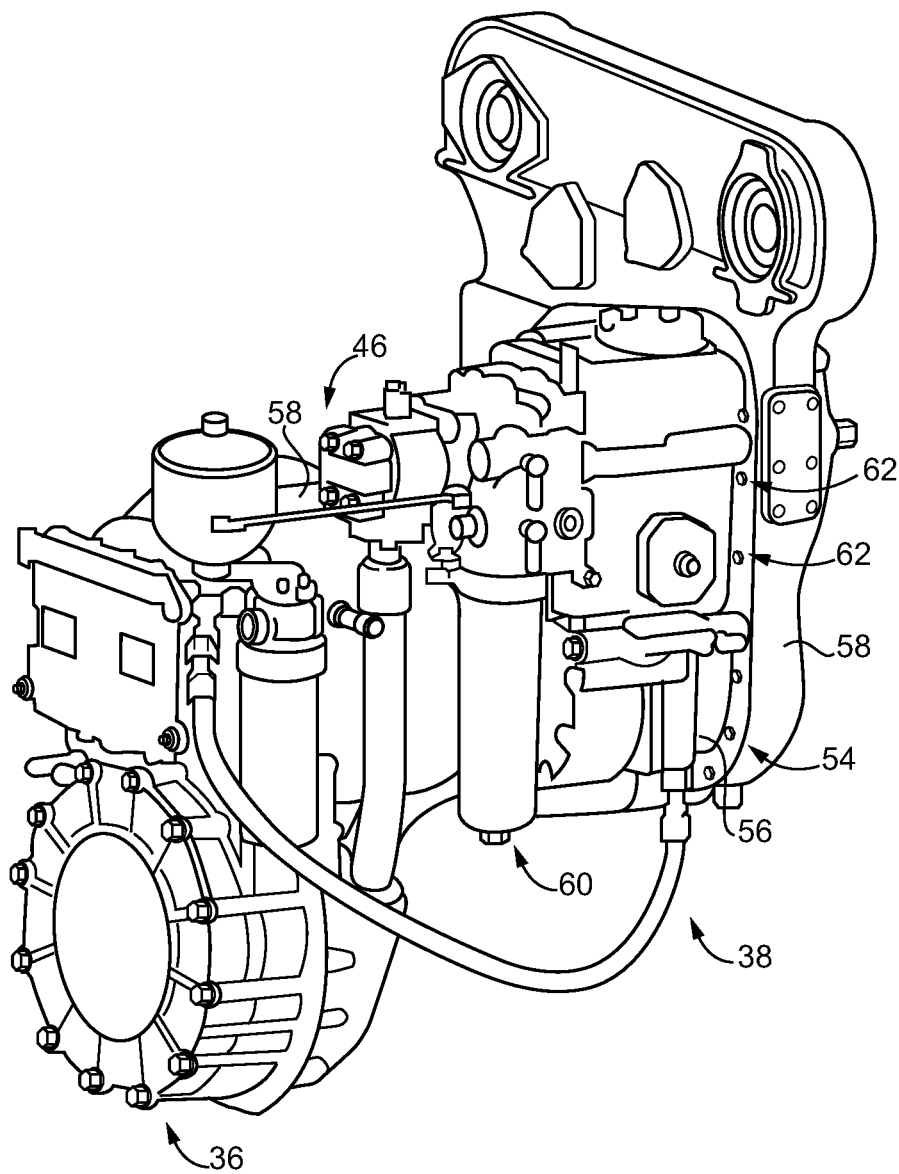
FIG. 2 is a diagrammatic view of a transmission suitable for use in the machine of FIG. 1.

Referring also now to FIG. 2, there are shown parts of energy storage system 34 including flywheel 36 shown as a flywheel module, and additional components of transmission 38 including a differential geartrain 46 not visible in FIG. 2 but positioned within a transmission housing 58. Also shown in FIG. 2 is a variator 54 positioned within a variator housing 56. Variator 54 may include a hydraulic variator, and in the FIG. 2 depiction variator housing 56 is mounted upon transmission housing 58 by way of a plurality of bolted connections 62. Variator fluid components 60 are also shown coupled to one or both of transmission housing 58 and variator housing 56. Variator fluid components can include filters, coolers, a charge pump, conduits, and a variety of other known components used in connection with hydraulic variators. It is contemplated that positioning variator housing 56 and other components externally to transmission housing 58 enables these serviceable components and systems to be easily and readily accessed for service and diagnostics.

Figure 3:
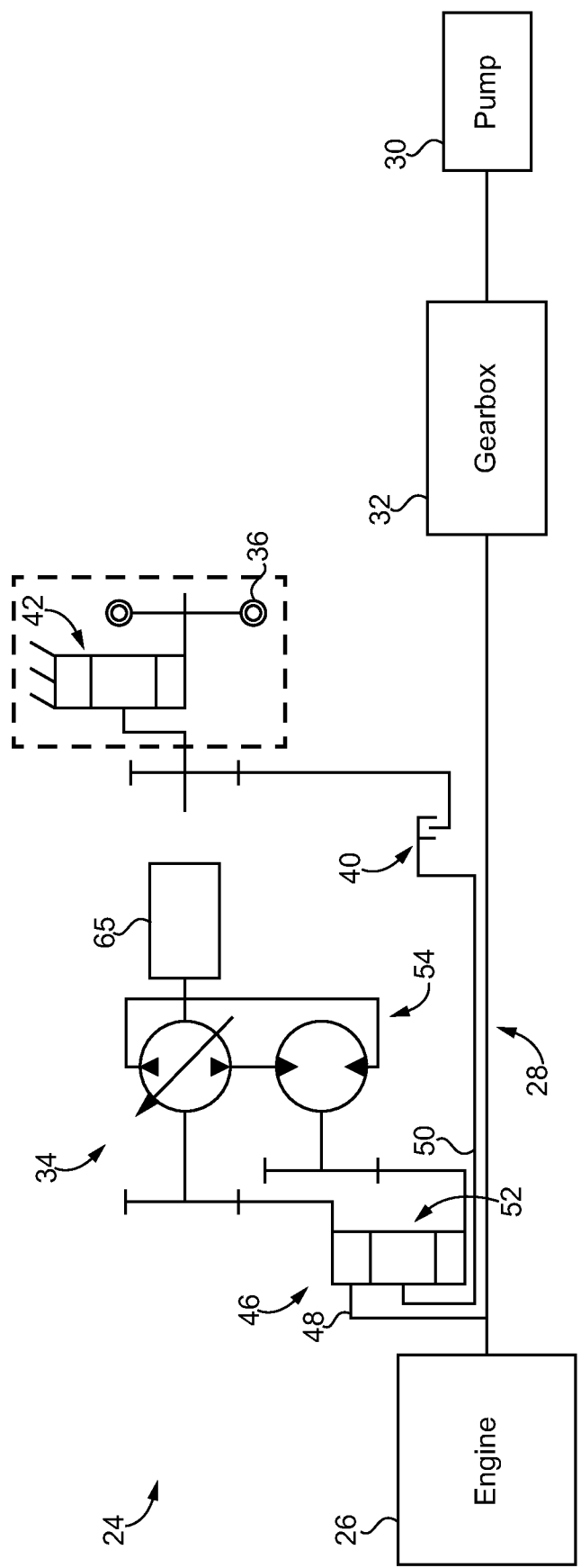
FIG. 3 is a schematic view of a power system, according to one embodiment.

Turning now to FIG. 3, there are shown additional components of power system 24 and energy storage system 34 in a schematic illustration. Variator 54 is coupled with a charge pump 65 in a generally conventional manner. Clutch 40 is shown coupled between differential geartrain 46 and flywheel 36. Speed-up geartrain 42 is shown coupled between clutch 40 and flywheel 36. In one embodiment, transfer gears (not numbered) may input torque to and receive torque from speed-up geartrain 42 and are coupled between clutch 40 and speed-up geartrain 42. In an implementation, speed-up geartrain 42 can include a planetary gearset that is structured to transfer energy to and receive energy from the one or more flywheels 36.

Differential geartrain 46 can also include a planetary gearset, and includes a rotatable input element 48 rotatable at a fixed speed ratio with and by driveshaft 28. Differential geartrain 46 also includes a rotatable output element 50 rotatable at a fixed speed ratio with and by flywheel 36. Differential geartrain 46 still further includes a rotatable speed control element 52 coupled between rotatable input element 48 and rotatable output element 50, and which may have multiple parts. Variator 54 is coupled to rotatable input element 48, and rotatable speed control element 52 in the illustrated embodiment. It is contemplated that variator 54 could be driven directly off the geartrain of engine 26, or driven directly off of driveshaft 28, or driven by differential geartrain 46. In other embodiments, variator 54 could be powered in a manner that is decoupled from rotation of engine 26 and/or driveshaft 28, such as where variator 54 includes an independently operated hydraulic variator or an electric variator, for instance.

Figure 4:
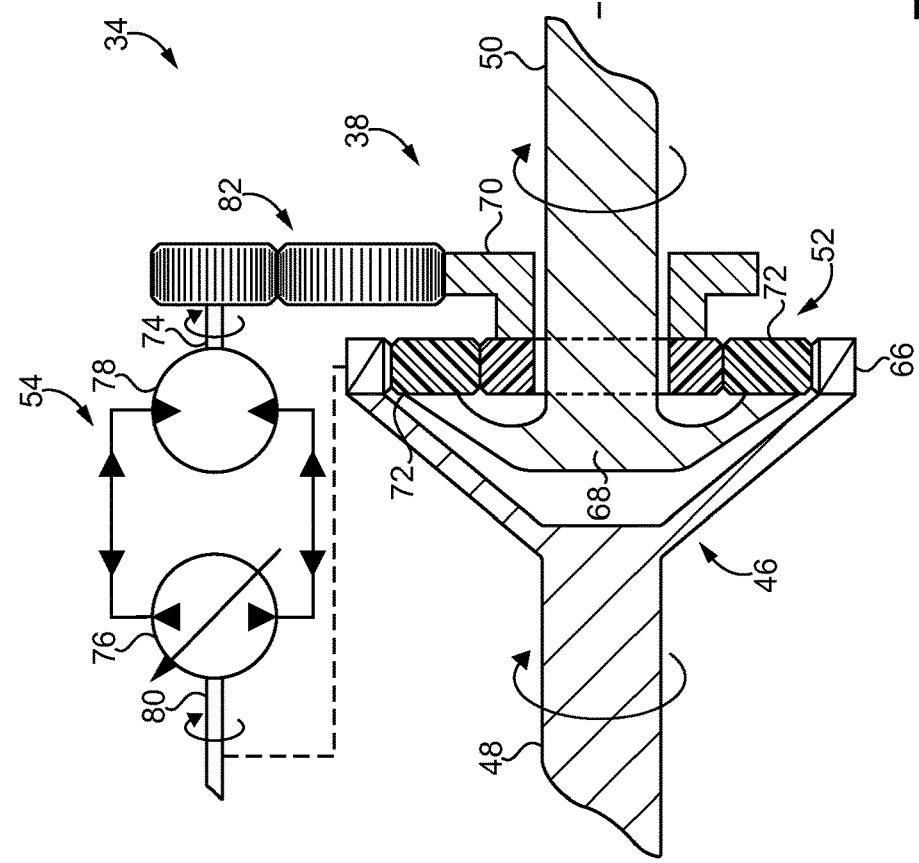
FIG. 4 is a partially sectioned side diagrammatic view of an energy storage system, according to one embodiment.

Referring now to FIG. 4, there are shown components of energy storage system 34 in greater detail. It can be seen that variator 54 includes a hydraulic pump 76 coupled with a variator input shaft 80. Variator input shaft 80 can be fixed to rotate with engine 26 and/or driveshaft 28, and can be mechanically coupled to differential geartrain 46 in some embodiments as noted above. Variator 54 also includes a hydraulic motor 78 coupled with a variator output shaft 74. Variator input shaft 80 and variator output shaft 74 are rotatable at a range of speed ratios relative to one another.

Hydraulic motor 78 can be operated in a forward direction, or a reverse direction, and at a range of speeds so as to rotate rotatable speed control element 52 at a range of speeds and vary a speed difference between rotatable input element 48 and rotatable output element 50. Variator output shaft 74 may be coupled with transfer gears 82 that could step up or step down variator shaft output speed depending upon design requirements. It is also contemplated that hydraulic motor 78 could operate in a pumping mode so as to drive pump 76 and apply a torque via variator input shaft 80 to a pump 30 if desired. In a practical implementation strategy variator 54 is fully reversible, and pump 76 could include a variable displacement swash plate-type pump, or any other suitable design.

Those skilled in the art will recognize differential geartrain 46 as a planetary gearset in the FIG. 4 illustration. Rotatable input element 48 can include or be coupled and fixed to rotate with a ring gear 66. Rotatable output element 50 can include or be coupled with a carrier 68. Rotatable speed control element 52 can include or be coupled with a sun gear 70 and a plurality of planet gears 72. Accordingly, sun gear 70 and planet gears 72 could be understood as a rotatable speed control element 52 that can vary a speed difference between rotatable input element 48 and rotatable output element 50 and thus vary a difference between an input speed and an output speed of transmission 38. Variator input shaft 80 can be fixed to rotate with ring gear 66 as suggested above. Variator output shaft 74 can be fixed to rotate with sun gear 70. Rotatable output element 50 can also be fixed to rotate with input shaft 64 of speed-up geartrain 42 and/or flywheel 36. It will be appreciated that various other gear configurations could fall within the scope of the present disclosure, and embodiments are contemplated where rotatable input element 48 and/or rotatable output element 50 are themselves one or more gears in a more complex geartrain rather than shafts or the like as illustrated. It is also contemplated that multiple variators might be used in parallel and balanced with one another to various ends. It is nevertheless contemplated that the arrangement depicted in FIG. 4, where transmission 38 is a parallel-path hydromechanical transmission with a single variator having a pump fixed to rotate with a ring gear 66 and a motor fixed to rotate with a sun gear 70, provides a practical implementation strategy consistent with size, complexity, and packaging constraints.

Figure 6:
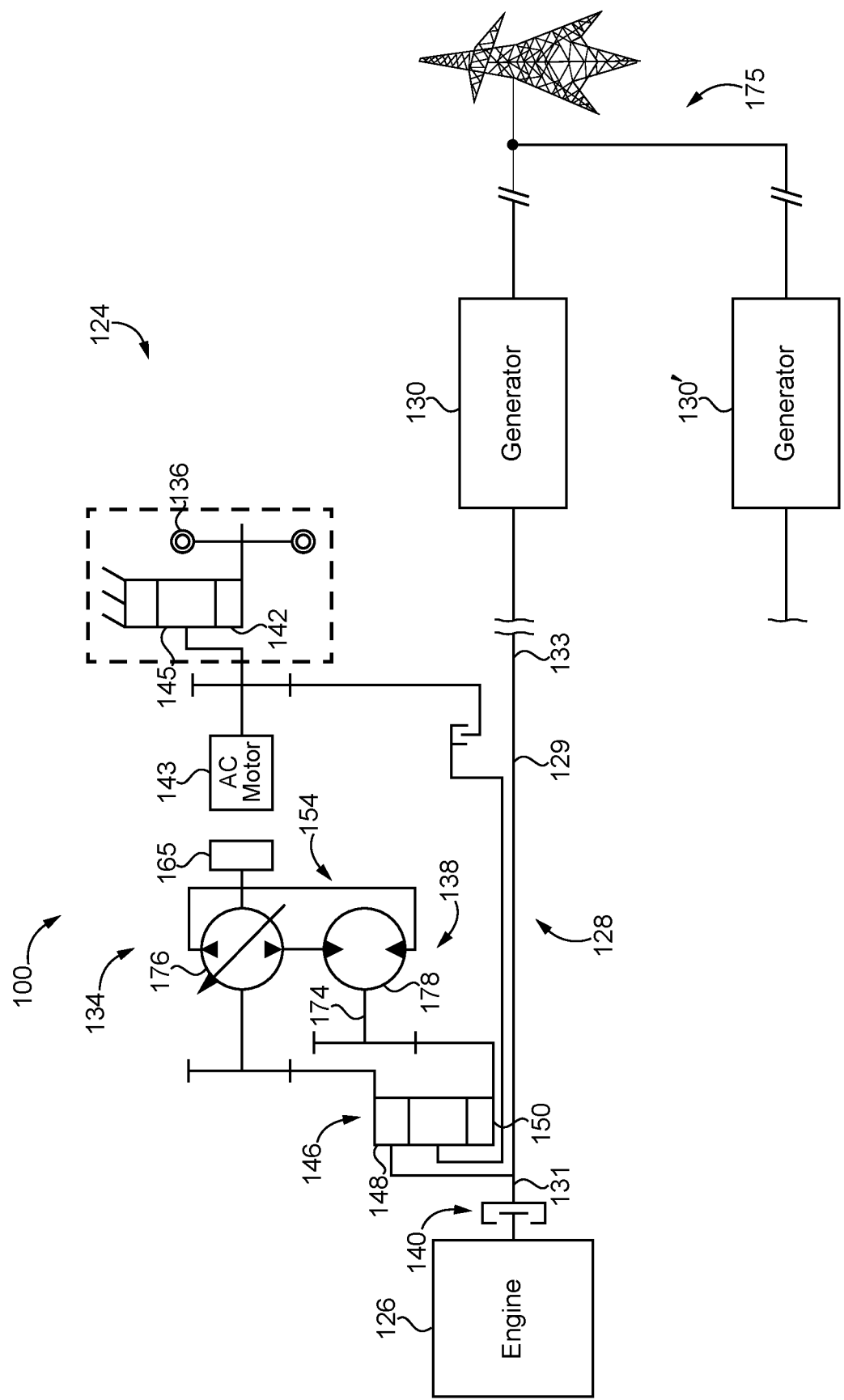
FIG. 6 is a schematic view of a power system, according to another embodiment.

Referring now to FIG. 6, there is shown an electric power system 124, according to one embodiment, and including an engine 126, a generator 130, and a drivetrain 128 structured to transfer torque between engine 126 and generator 130. Generator 130 is coupled with an electric power grid 175 or other electric load, that may also be fed by an additional generator 130[1]. It should be appreciated that any number of generators of many different types might be coupled with electric power grid 175, some or all of which can be powered by an internal combustion engine such as engine 126. Some, none, or all of the generators coupled with electric power grid 175 will be operated at any one time depending upon electrical load demand of electric power grid 175. It will thus be appreciated that generator 130 and generator 130' may be varied in operation, turned on, shut down, et cetera, periodically as electrical load demand changes. As will be further apparent from the following description, electric power system 124 is structured to enable generator 130 to vary in electric power output, be brought online or taken offline, without significant, and potentially substantially zero in some instances, changes in generator speed. During such operational changes, however, a speed of engine 126 can be permitted to vary. In a practical implementation, engine speed can vary to a greater relative extent than a varying of generator speed that occurs in response to a changed load demand on generator 130. Varying energy transfer among components of electric power system 124 can be used to control engine speed, as further discussed herein.

It can also be noted that many of the components, features, and operational characteristics of electric power system 124 are similar or identical to those set forth in FIGS. 1-5, and it should therefore be appreciated that the description herein of operation or components of any one embodiment can be understood by way of analogy to refer also to operation or components of any other embodiment, except where otherwise indicated. Drivetrain 128 may be part of a drive system 100, and includes a driveshaft 129. Driveshaft 129 can include any number of shafts or shaft-like components, including potentially clutches, gears, et cetera, capable of forming a mechanical coupling between engine 126 and generator 130. Drive system 100, more particularly drivetrain 128, includes an input shaft 131 structured to couple with engine 126, and an output shaft 133 structured to couple with generator 130. Drive system 100 further includes an energy storage system 134 having a flywheel 136, a speed-up geartrain 142 coupled with flywheel 136, and an electric motor 143, such as an AC motor, coupled to speed-up geartrain 142 for charging flywheel 136. Speed-up geartrain 142 can also include an input gear 145 coupled with electric motor 143 that rotates at a range of speeds relative to engine 126 when clutch 140 is in the engaged state.

In an implementation, flywheel 136, referred to herein in the singular for convenience, can include a plurality of flywheel modules, analogous to those described in connection with foregoing embodiments. Speed-up geartrain 142 can also include a planetary gearset, again analogous to that described in connection with foregoing embodiments. Electric motor 143 can be electrically connected with generator 130, or potentially connected with electric power grid 175, or electrically powered by still another mechanism or strategy. Drive system 100 also includes a clutch 140 adjustable between an engaged state where clutch 140 couples speed-up geartrain 142 to at least one of engine 126 or drivetrain 128, and a disengaged state. Clutch 140 could include a double-acting clutch, multiple separate clutches, or a single clutch, of any suitable configuration and will typically be hydraulically actuated, although the present disclosure is not thereby limited. In the embodiment of FIG. 6, clutch 140 couples engine 126 at a fixed speed ratio to input shaft 131 in the engaged state, and with engine 126 being disconnected from input shaft 131 and therefore all of drive system 100 and generator 130 in the disengaged state. As will be further apparent from the following description, disengaging engine 126 enables engine 126 to be placed in a standby mode, turned off or operating at or below low idle, but reengaged as needed to accommodate demands on generator 130. When engine 126 is decoupled in this general manner, electric motor 143 can be operated to maintain a charge state of flywheel 136, and additionally or alternatively operated to rotate other components in drive system 100, as well as generator 130 itself. Those skilled in the art will appreciate the practical applications of maintaining some of the components or all of the components of drive system 100 and generator 130 rotating at some minimum speed even when electric power system 124 is not actively producing electric power to flow to electric power grid 175. As further discussed herein, other implementations contemplate using transfer of flywheel energy to engine 126 to accelerate or assist in accelerating engine 126 to accommodate a load demand of generator 130, including short-term step loads.

Electric power system 124 further includes a parallel-path continuously variable transmission 138 having a variator 154. Variator 154 can include a hydraulic variator having a hydraulic motor 178 coupled with a variable displacement pump 176, and a variator output shaft 174. Transmission 138 can further include a differential geartrain 146 such as a planetary gearset having a rotatable input element 148 structured to rotate at a fixed speed ratio with engine 126 when clutch 140 is in the engaged state, and a rotatable output element 150. Operation of transmission 138 as it relates to charging flywheel 136 and also as it relates to transferring energy from flywheel 136 to driveshaft 129 is generally analogous to that described in connection with foregoing embodiments. It should be appreciated that various clutches, transfer gears, and other componentry may be coupled between driveshaft 129 and flywheel 136, including elements shown but not numbered in FIG. 6 and/or elements not pictured. Moreover, rather than a total of one differential geartrain embodiments are contemplated wherein multiple differential geartrains are provided for attaining speed matching between and among driveshaft 129, flywheel 136, and engine 126 as the case may be. In the illustrated embodiment, rotatable output element 150 is structured to rotate at a fixed speed ratio with flywheel 136. A charge pump 165 for variator 154 is also shown in FIG. 6 and could be powered by any suitable means.

Figure 7:
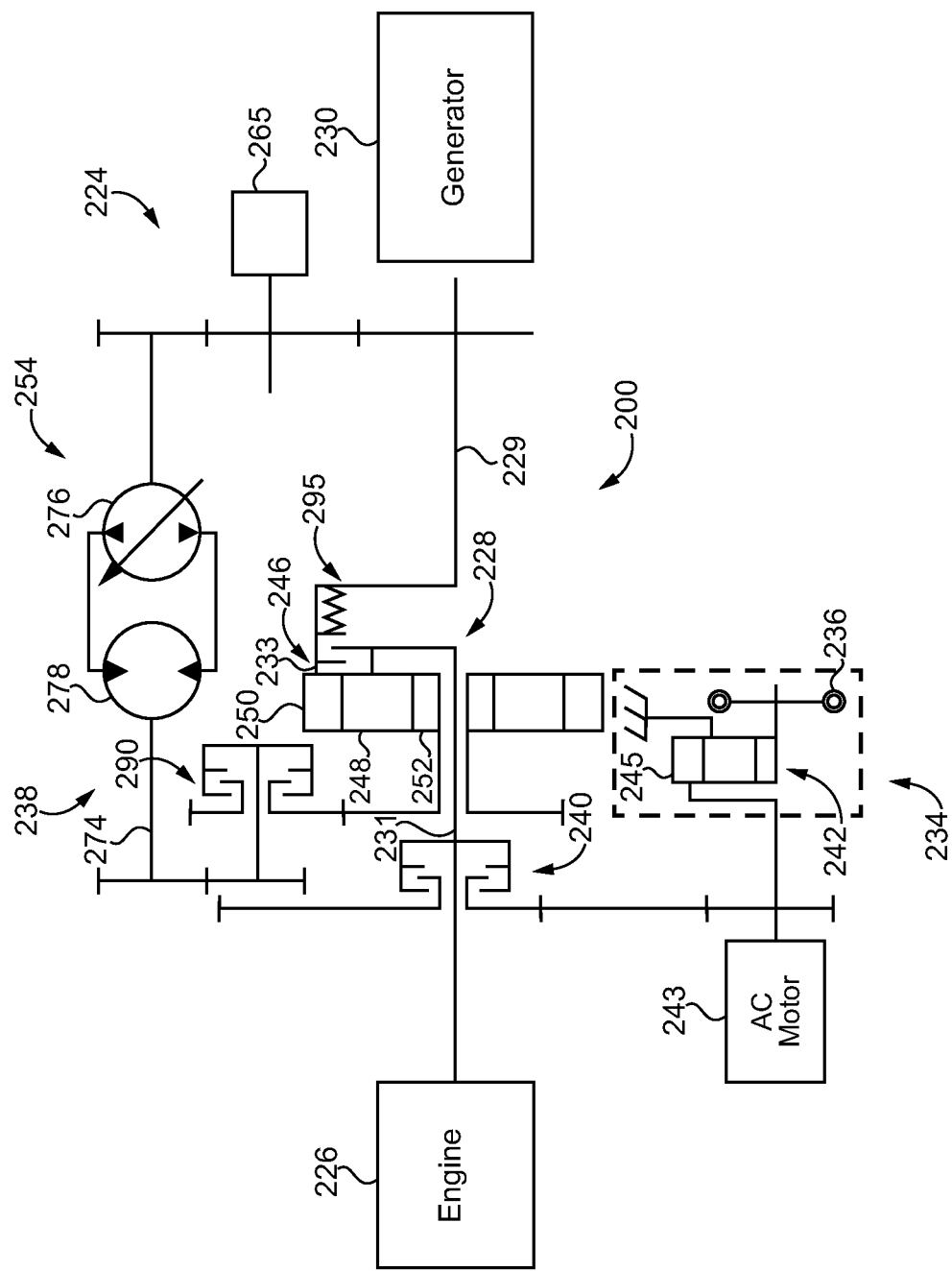
FIG. 7 is a schematic view of a power system, according to yet another embodiment.

Referring now to FIG. 7, there is shown an electric power system 224 according to another embodiment, and having certain similarities with electric power system 124 of FIG. 6 but also certain differences. Electric power system 224 includes an engine 226, a generator 230, and a drive system 200 having a drivetrain 128 structured to transfer torque between engine 226 and generator 230. An input shaft is shown at 231 and an output shaft at 233. Drive system 200 also includes a driveshaft 229 that can be configured analogously in a variety of ways to that of driveshafts described elsewhere in the present disclosure. Electric power system 224 also includes an energy storage system 234 having a flywheel 236, a speed-up geartrain 242 coupled with flywheel 236, and an electric motor 243 coupled to speed-up geartrain 242 for charging flywheel 236. Drive system 200 also includes a clutch 240 adjustable between an engaged state where clutch 240 couples speed-up geartrain 242 and thus flywheel 236 to at least one of engine 226 or drivetrain 228, and a disengaged state. In the illustrated embodiment, clutch 240 can couple speed-up geartrain 242 to engine 226 at the same time that engine 226 is coupled to input shaft 231, thus coupling engine 226 simultaneously to speed-up geartrain 242 and flywheel 246, as well as other components of drive system 200 and generator 230 depending upon the state of other clutches in drive system 200. Speed-up geartrain 242 may be coupled with electric motor 243, and includes an input gear 245 structured to rotate at a fixed speed ratio with engine 226 when clutch 240 is in the engaged state Electric power system 224 also includes a parallel-path continuously variable transmission 238 including a variator 254. Variator 254 can include a hydraulic motor 278 and a variable displacement pump 276. A charge pump is shown at 265. A variator output shaft is shown at 274. Transmission 238 is within drivetrain 228, such that differential geartrain 246 forms a mechanical coupling between engine 226 and generator 230, in contrast with the embodiment of FIG. 6 wherein transmission 138 is coupled between engine 126 and flywheel 136. Differential geartrain 146 includes at least one rotatable speed control element 252, and includes a second clutch 290 coupled between variator output shaft 274 and rotatable speed control element 252. A third clutch 295 is coupled with differential geartrain 246 between output shaft 233 and generator 230. It will be recalled that applications of the embodiment of FIG. 6 include transferring energy from flywheel 136 to engine 126 when engine 126 is in a standby mode and decoupled from other parts of electric power system 124, as well as applications where engine 126 is operating to rotate other parts of electric power system 124 and flywheel energy is transferred to accelerate engine 126 to accommodate a generator step load. Electric power system 224 can be analogously operated to bring engine 226 online from standby, or to increase engine speed to increase engine power output for accommodating a generator step load. Those skilled in the art will appreciate other operational characteristics and applications, including not only transferring energy from flywheels 136 and 236 to engines 126 and 226, respectively, but also for purposes of transferring energy from drivetrains 128 and 228 to flywheels 136 and 236, respectively.

INDUSTRIAL APPLICABILITY

Referring now to the drawings generally, during operation of engine 26 driveshaft 28 can be rotated to turn gears in gearbox 32 and apply a torque to a rotatable load such as pump 30. As noted above, the rotatable load could include a final drive in a machine drivetrain, industrial or mining equipment, or some other piece of typically heavy-duty machinery. Energy storage system 34 could be structured so that flywheel 36 is decoupled from transmission 38 by disconnecting a controllable lockup clutch or the like. It is also contemplated that variator 54 and/or other components could be controllably placed in such a state that while the mechanical connection between flywheel 36 and driveshaft 28 is not interrupted no energy is presently being transferred between flywheel 36 and driveshaft 28. It is nevertheless contemplated that much of the time, or substantially all of the time, energy storage system 34 will be operated such that energy is transferred between driveshaft 28 and energy storage flywheel 36 with the pattern of energy transfer being controllable by way of variator 54 as further discussed herein.

In general terms, if carrier 68 accelerates, flywheel 36 is accelerated and energy will flow from driveshaft 28 and rotatable input element 48 to flywheel 36. If carrier 68 decelerates, flywheel 36 decelerates and energy will flow from flywheel 36 to rotatable input element 48 and driveshaft 28. If ring gear 66 has a constant positive speed and sun gear 70 has a positive acceleration, carrier 68 will tend to accelerate. Acceleration of sun gear 70 is directly proportional to acceleration of variator output shaft 74, and speed of variator output shaft 74 is proportional to speed of variator input shaft 80, displacement of hydraulic pump 76 and displacement of hydraulic motor 78. Acceleration of variator output shaft 74 is in turn proportional to the rate of change of displacement of hydraulic pump 76. Acceleration or deceleration of flywheel 36 and thus energy flow into or out of flywheel 36 may therefore be proportional to the rate of change of displacement of hydraulic pump 76. Those skilled in the art will appreciate that incorporation of additional or alternative speed control elements such as differential geartrains and/or other changes to the architecture of power system 24 could result in different patterns or modes of energy transfer.

Ring gear 66 and rotatable input element 48 will typically continuously rotate so long as driveshaft 28 is rotating. It will thus be understood that by varying the speed of a gear such as sun gear 70 in differential geartrain 46 with variator 54, a pattern of the transfer of energy between driveshaft 28 and flywheel 36 including at least one of magnitude of energy transfer or direction of energy transfer can be changed. The varying of the speed of sun gear 70 occurs in response to varying the speed of hydraulic motor 78, which in turn is varied in response to varying a displacement of pump 76 in the illustrated configuration. A transfer of energy from the energy storage flywheel to the driveshaft 28 or from the driveshaft 28 to the energy storage flywheel can be initiated, increased, decreased, or interrupted, in response to the varying of the speed of the output shaft 133. The flexibility described herein in connection with matching speeds and controlling the magnitude and/or direction of energy transfer between flywheel 36 and driveshaft 28 is achieved with a single range transmission. It will nevertheless be appreciated that multiple ranges could be provided in a transmission configuration according to the present disclosure.

Figure 5:
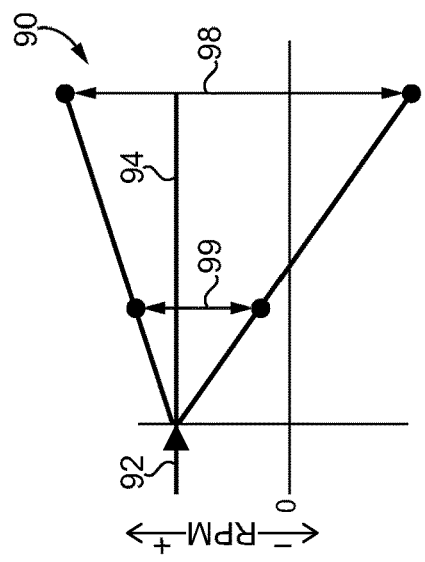
FIG. 5 is a nomogram illustrating functional properties of a transmission in an energy storage system, according to one embodiment.

Referring now to FIG. 5, there is shown a nomogram illustrating functional and relational properties of power system 24 and energy storage system 34. In nomograph 90 reference numeral 92 indicates a speed input of ring gear 66. Line 94 represents constant speed of ring gear 66. Unless engine speed is varied, these components and ones that are directly coupled therewith will not vary. Line 98 represents the speed range of sun gear 70 as driven by variator output shaft 74 both above and below the zero speed line. Reference numeral 99 identifies a speed range of carrier 68 and generally flywheel speed, although it should be appreciated a speed-up of as much as a 15:1 ratio or even greater between carrier speed and flywheel speed might be used.

Electric power systems 124 and 224 can operate in a manner that will be understood in many respects from the foregoing description of operation of other embodiments contemplated herein, but with certain differences. Moreover, it will be appreciated that certain of the operating characteristics and properties of electric power system 124 may be different from those of electric power system 224. Operating electric power system 124, 224 can include operating drivetrain 128, 228 to apply a torque to generator 130, 230. As noted above, operating of drivetrain 128, 228 can be achieved wholly or in part by way of transferring energy from flywheel 136, 236 to drivetrain 128, 228. For instance, engine 126, 226 may not be applying a torque at all to drivetrain 128, 228, with electric motor 143, 243 used to operate drivetrain 128, 228 and to maintain rotating components of electric power system 124, 224 at some minimum rotational speed. In other instances, electric motor 143, 243 can be used to maintain flywheel charge, compensating for parasitic losses, while engine 126, 226 is otherwise meeting the power needs of generator 130, 230. Adjusting clutch 140, 240 between the engaged state and the disengaged state can vary energy transfer among engine 126, 226, flywheel 136, 236, and generator 130, 230. When it is desirable to initiate energy transfer from flywheel 136, 236 to engine 126, 226, clutch 140, 240 can be engaged to begin accelerating engine 126, 226. In the case where engine 126, 226 is in a standby mode, with drivetrain 128, 228 otherwise operating, engaging clutch 140, 240 can gradually accelerate engine 126, 226 to a speed at which engine 126, 226 can accommodate whatever power output is required. It should be appreciated that clutch pressure might be modulated differently in connection with the embodiment of FIG. 6 versus the embodiment of FIG. 7, at least for the reason that the oncoming load demands on the subject engine can vary based upon differences in the system architectures. Where flywheel energy is transferred as a power assist when engine 126, 226 is already in an operating mode, as opposed to a standby mode, similar processes may be executed to bring engine 126, 226 up to speed as desired. It will also be appreciated that a speed of engine 126, 226 can be changed in response to varying of energy transfer among engine 126, 226, flywheel 136, 236, generator 130, 230, without changing or without substantially changing a speed of generator 130, 230. Where engine speed is changed in response to transferring energy from flywheel 136, 236, the engine speed may change to a relatively greater extent than any change in generator speed that occurs in response to a generator load change. Such capabilities can assist generator output frequency matching a frequency required by or desired by electric power grid 175, for instance. In the case of the embodiment of FIG. 7, operating drivetrain 228 and energy storage system 234 in the manner described herein can include operating transmission 238 to transfer torque to or from engine 226 and/or to or from flywheel 236, or from motor 243. With regard to the FIG. 6 embodiment, operating drivetrain 128 in the manner described herein can include operating transmission 138 to transfer torque to or from engine 126 and/or to or from flywheel 136, or from motor 143. In either case, torque can be transferred to the corresponding generator 130, 230 from one or more of the available electric motor, flywheel, or engine sources as described herein. For example, applying torque to generator 130, 230 may include applying torque produced by electric motor 143, 243 and engine 126, 226, or electric motor 143, 243 but not engine 126, 226.

Figure 8:
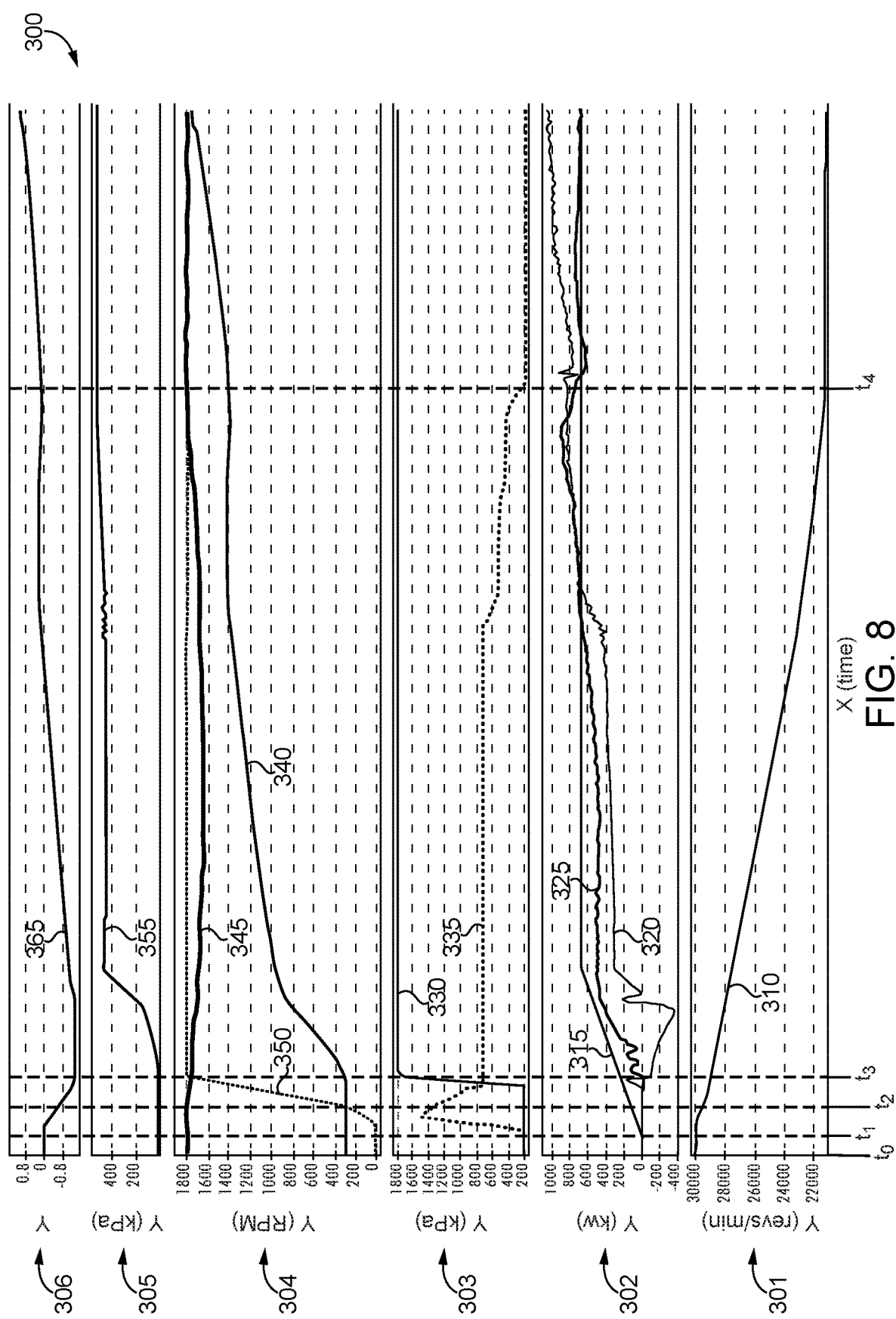
FIG. 8 is a graph of power system parameters during a generator load change.

Referring now to FIG. 8, there is shown a composite graph relating different electric power system operating parameters according to the present disclosure on the Y-axis to time on the X-axis. In a trace or strip 306, motor speed ratio 365 is shown, indicating how a variator is controlled according to the present disclosure to match engine speed and generator speed. At a time $t_0$, the variator motor clutch is open such that the variator is "floating," and set at zero displacement. In another strip 302, generator load 315 is shown. When generator load or load change is first detected, engine and flywheel clutches can be engaged to couple the flywheel to the engine and begin pulling the engine up to speed by way of flywheel-stored energy. Also shown in strip 302 are engine load 320 and engine combustion power 325, each of which begins to vary by about a time $t_3$. After time $t_3$ and before a later time $t_4$, an engine speed 340 shown in another strip 303 continues to climb and engine combustion power 320 begins to contribute to covering generator load 315. Also between time $t_3$ and time $t_4$ generator droop ceases and recovers. In another strip 305, a motor clutch pressure, corresponding to a clutch pressure of clutch 290, for example, is shown at 355 reflecting clutch pressure modulated to transfer energy from the variator to the differential geartrain. Also shown in strip 304 is a generator speed at 345 and a desired engine speed at 350. In another strip 303, engine clutch pressure is shown at 330, and flywheel clutch pressure is shown at 335. In another strip 301, flywheel speed is shown at 310.

The operational parameters shown in FIG. 8 can be understood to apply to the embodiment of FIG. 7, however, it will be appreciated applications of the methodology and properties depicted in FIG. 8 could be applied in whole or in part to the other embodiments contemplated herein. At a time $t_1$ generator load or load change is first detected as noted above. It can be seen that speed ratio 365 is changed in response to the generator load as pump displacement is increased, for instance. At about a time $t_3$ clutch pressure 355 is increased so as to apply variator output torque to the differential geartrain. As shown in strip 304 at a time $t_2$ desired engine speed is rapidly increased, and engine speed 340 is more or less gradually increased without substantially changing generator speed 345 up until a point at which engine speed and generator speed are eventually matched. In strip 303 it can be seen that flywheel clutch pressure 335 is increased between a time $t_1$ and $t_2$, held steady during transferring energy from the flywheel 236 to the engine, and then decreased to about zero by time $t_3$. Engine clutch pressure 330 is increased to fully engage the engine at about time $t_3$. It will be recalled that clutch 240 can include multiple clutches, with separately controllable pressures. At strip 301 flywheel speed 310 gradually decreases to approximately a minimum at a time $t_4$. An electric motor coupled to the flywheel can be employed beginning at about time $t_4$, or potentially thereafter, when flywheel clutch pressure drops back to zero and transferring energy from flywheel 236 is no longer necessary.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An electric power system comprising:
    an engine;
    a generator;
    a drivetrain structured to transfer torque between the engine and the generator;
    an energy storage system having a flywheel, a speed-up geartrain coupled with the flywheel, and an electric motor coupled to the speed-up geartrain for charging the flywheel;
    a clutch adjustable between an engaged state where the clutch couples the speed-up geartrain to at least one of the engine or the drivetrain, to transfer energy between the flywheel and the at least one of the engine or the drivetrain, and a disengaged state;
    a continuously variable transmission including a variator, and a differential geartrain;
    the differential geartrain having a rotatable input element structured to rotate at a fixed speed ratio with the engine when the clutch is in the engaged state, and a rotatable output element; and
    the variator includes a hydraulic variator having a hydraulic motor and a variable displacement pump.

2. The electric power system of claim 1 wherein the continuously variable transmission directly transmits torque to the drivetrain, such that the differential geartrain forms a mechanical coupling between the engine and the generator.

3. The electric power system of claim 2 wherein the variator includes a variator output shaft, and the differential geartrain includes at least one rotatable speed control element, and the electric power system further comprising a second clutch coupled between the variator output shaft and the at least one rotatable speed control element.

4. The electric power system of claim 1 wherein the speed-up geartrain includes an input gear structured to rotate at a fixed speed ratio with the engine when the clutch is in the engaged state.

5. The electric power system of claim 1 wherein the continuously variable transmission is coupled between the drivetrain and the speed-up geartrain.

6. The electric power system of claim 5 wherein the rotatable output element is structured to rotate at a fixed speed ratio with the flywheel.

7. A method of operating an electric power system, the method comprising:
    operating a drivetrain coupled between an engine and a generator in the electric power system;
    applying a torque to the generator by way of the operating of the drivetrain;
    rotating an energy storage flywheel in the electric power system by way of an electric motor;
    adjusting a clutch in the electric power system between an engaged state where the clutch couples the energy storage flywheel to at least one of the engine or the drivetrain, and a disengaged state; and
    varying energy transfer among the engine, the energy storage flywheel, and the generator by way of the adjusting of the clutch between the engaged state and the disengaged state;
    wherein the operating of the drivetrain further includes operating a parallel-path continuously variable transmission in the drivetrain having a variator and a differential geartrain, and the variator including a hydraulic variator having a hydraulic motor and a variable displacement pump.

8. The method of claim 7 wherein the adjusting of the clutch includes adjusting the clutch from the disengaged state to the engaged state, such that the varying of the energy transfer includes initiating energy transfer from the energy storage flywheel to the engine.

9. The method of claim 8 wherein the operating of the drivetrain includes operating the drivetrain using the flywheel while the engine is in a standby mode where the engine does not operate the drivetrain.

10. The method of claim 9 wherein the applying of the torque to the generator includes applying torque produced by the electric motor and not the engine.

11. The method of claim 8 wherein the operating of the drivetrain includes operating the drivetrain with the engine when the engine is in an operating mode.

12. The method of claim 11 wherein the applying of the torque to the generator includes applying torque produced by the electric motor and the engine.

13. The method of claim 8 wherein the initiating of the energy transfer from the energy storage flywheel to the engine includes initiating the energy transfer in response to a change to a load demand of the generator.

14. A drive system for an electric power system comprising:
    a drivetrain including an input shaft structured to couple with an engine, an output shaft structured to couple with a generator, and a continuously variable transmission coupled between the input shaft and the output shaft;
    an energy storage system coupled with the drivetrain and having a flywheel, a speed-up geartrain coupled with the flywheel, and an electric motor coupled to the speed-up geartrain for charging the flywheel; and a clutch adjustable between an engaged state where the clutch couples the speed-up geartrain to the input shaft, to transfer energy between the flywheel and at least one of the engine or the drivetrain, and a disengaged state;

the continuously variable transmission includes a variator having a variator input shaft and a variator output shaft, and the variator input shaft and the variator output shaft are rotatable at a range of speed ratios relative to one another; and the speed-up geartrain is rotatable at only a fixed speed ratio relative to the at least one of the engine or the drivetrain when the clutch is in the engaged state coupling the speed-up geartrain to the input shaft.

15. The drive system of claim 14 wherein the continuously variable transmission includes a hydraulic variator, and a differential geartrain forming a mechanical coupling between the input shaft and the output shaft of the drivetrain.

16. The drive system of claim 15 further comprising a second clutch coupled between the hydraulic variator and the differential geartrain, and a third clutch coupled with the differential geartrain and structured to selectively engage or disengage the differential geartrain with the generator.

* * * * *